(12) United States Patent
Tsai

(10) Patent No.: US 11,736,807 B2
(45) Date of Patent: Aug. 22, 2023

(54) VEHICULAR IMAGE PICKUP DEVICE AND IMAGE CAPTURING METHOD

(71) Applicant: GETAC TECHNOLOGY CORPORATION, New Taipei (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 17/535,531

(22) Filed: Nov. 24, 2021

(65) Prior Publication Data
US 2022/0086325 A1 Mar. 17, 2022

Related U.S. Application Data

(62) Division of application No. 16/034,098, filed on Jul. 12, 2018, now abandoned.

(51) Int. Cl.
H04N 23/73 (2023.01)
B60R 11/04 (2006.01)
H04N 23/56 (2023.01)
H04N 23/72 (2023.01)
H04N 23/74 (2023.01)
H04N 23/76 (2023.01)
H04N 23/80 (2023.01)
H04N 25/40 (2023.01)
G06T 7/00 (2017.01)

(52) U.S. Cl.
CPC ............. H04N 23/73 (2023.01); B60R 11/04 (2013.01); G06T 7/97 (2017.01); H04N 23/56 (2023.01); H04N 23/72 (2023.01); H04N 23/74 (2023.01); H04N 23/76 (2023.01); H04N 23/80 (2023.01); H04N 25/40 (2023.01)

(58) Field of Classification Search
None
See application file for complete search history.

(56) References Cited

U.S. PATENT DOCUMENTS

| | | | | |
|---|---|---|---|---|
| 5,083,209 A * | 1/1992 | Inoue | .................... | H04N 5/2352 348/363 |
| 5,194,960 A * | 3/1993 | Ota | ....................... | H04N 5/2351 348/224.1 |
| 5,420,635 A * | 5/1995 | Konishi | ................ | H04N 5/2353 348/E5.037 |
| 5,579,049 A * | 11/1996 | Shimaya | ............... | H04N 5/2352 348/E5.037 |
| 5,818,528 A * | 10/1998 | Roth | ..................... | H04N 5/2352 250/214 AG |
| 6,473,522 B1 * | 10/2002 | Lienhart | ................. | G06T 7/194 382/164 |
| 6,674,475 B1 * | 1/2004 | Anderson | ............ | H04N 5/2353 348/E5.037 |
| 8,630,497 B2 * | 1/2014 | Badawy | ............. | G06K 9/00536 382/104 |

(Continued)

Primary Examiner — Stefan Gadomski

(57) ABSTRACT

A vehicular image pickup device includes an image capturing unit and a processing unit. The image capturing unit captures a plurality of driving images sequentially. The driving images each include an object image. The processing unit performs an image analysis on two of the plurality of driving images to obtain a variance of the object image and sets a shutter speed of the image capturing unit according to the variance.

4 Claims, 12 Drawing Sheets

(56) References Cited

U.S. PATENT DOCUMENTS

| | | | |
|---|---|---|---|
| 9,571,741 B1* | 2/2017 | Ramsay | H04N 5/2351 |
| 10,051,180 B1* | 8/2018 | Chen | H04N 5/247 |
| 10,373,316 B2* | 8/2019 | Jales Costa | H04N 7/183 |
| 2002/0080013 A1* | 6/2002 | Anderson, III | G07C 5/0891 340/936 |
| 2005/0093996 A1* | 5/2005 | Kinoshita | H04N 5/2357 348/E5.037 |
| 2005/0196043 A1* | 9/2005 | Jung | G06V 20/62 382/176 |
| 2005/0218295 A1* | 10/2005 | Nakamura | H04N 5/243 348/E5.041 |
| 2006/0008267 A1* | 1/2006 | Kim | H04N 5/2353 348/E5.037 |
| 2006/0126934 A1* | 6/2006 | Ichimura | G06V 10/145 382/172 |
| 2006/0165287 A1* | 7/2006 | Huang | G06V 30/413 382/176 |
| 2006/0284992 A1* | 12/2006 | Kinoshita | H04N 5/2357 348/226.1 |
| 2007/0058966 A1* | 3/2007 | Irinouchi | H04N 5/23254 348/E5.037 |
| 2007/0201853 A1* | 8/2007 | Petschnigg | G06T 5/50 348/E5.038 |
| 2008/0204564 A1* | 8/2008 | Yumiki | H04N 5/23248 348/E5.037 |
| 2008/0204565 A1* | 8/2008 | Yumiki | H04N 5/2353 348/E5.037 |
| 2009/0096898 A1* | 4/2009 | Sambongi | H04N 5/202 348/254 |
| 2009/0128640 A1* | 5/2009 | Yumiki | H04N 5/23261 359/554 |
| 2009/0157268 A1* | 6/2009 | Chiba | G08G 1/16 701/99 |
| 2009/0208059 A1* | 8/2009 | Geva | G08G 1/14 382/104 |
| 2010/0092104 A1* | 4/2010 | Klijn | H04N 1/4074 382/275 |
| 2010/0110208 A1* | 5/2010 | Gerwe | H04N 5/2256 348/370 |
| 2010/0290030 A1* | 11/2010 | Groitzsch | G01S 17/34 356/28.5 |
| 2011/0115898 A1* | 5/2011 | Hikosaka | H04N 9/0451 348/81 |
| 2011/0129166 A1* | 6/2011 | Nishiyama | H04N 5/23248 382/263 |
| 2011/0273589 A1* | 11/2011 | Mochimizo | H04N 5/23218 348/E5.024 |
| 2011/0292216 A1* | 12/2011 | Fergus | G06T 5/00 348/E5.09 |
| 2011/0310249 A1* | 12/2011 | Lambert | H04N 5/353 348/148 |
| 2012/0106802 A1* | 5/2012 | Hsieh | G06V 20/63 382/105 |
| 2012/0148101 A1* | 6/2012 | Yoon | G06V 20/62 382/103 |
| 2012/0188414 A1* | 7/2012 | Ross | H04N 5/2352 348/241 |
| 2012/0219190 A1* | 8/2012 | Kumagai | G06T 3/4038 382/104 |
| 2013/0135501 A1* | 5/2013 | Irinouchi | H04N 5/3572 348/246 |
| 2013/0188044 A1* | 7/2013 | Tsou | H04N 7/181 348/143 |
| 2013/0272607 A1* | 10/2013 | Chattopadhyay | G06V 30/162 382/177 |
| 2013/0308009 A1* | 11/2013 | Yoshida | H04N 5/243 348/230.1 |
| 2013/0343613 A1* | 12/2013 | Heger | G01B 11/026 382/106 |
| 2014/0072218 A1* | 3/2014 | Kim | H04N 1/4074 382/170 |
| 2014/0168377 A1* | 6/2014 | Cluff | G06T 7/85 348/47 |
| 2014/0177925 A1* | 6/2014 | Wu | G08G 1/0175 382/105 |
| 2014/0320695 A1* | 10/2014 | Ozawa | H04N 5/2353 348/229.1 |
| 2015/0116582 A1* | 4/2015 | Yoshikawa | G01B 11/25 348/362 |
| 2015/0120153 A1* | 4/2015 | Heim | G06V 20/58 382/103 |
| 2016/0117975 A1* | 4/2016 | Kang | H04N 5/202 345/694 |
| 2016/0203379 A1* | 7/2016 | Hakim | G06V 10/752 382/105 |
| 2016/0212349 A1* | 7/2016 | Imada | H04N 5/23258 |
| 2016/0301872 A1* | 10/2016 | Kameda | H04N 5/145 |
| 2017/0017845 A1* | 1/2017 | Bobbitt | G06V 10/758 |
| 2017/0024631 A1* | 1/2017 | Hong | G06T 7/194 |
| 2017/0171447 A1* | 6/2017 | Yasuda | H04N 5/232939 |
| 2017/0262716 A1* | 9/2017 | Matsumoto | G08G 1/166 |
| 2017/0270650 A1* | 9/2017 | Howe | G06V 10/764 |
| 2017/0280026 A1* | 9/2017 | Uejima | G06T 7/246 |
| 2017/0339363 A1* | 11/2017 | Hiasa | H04N 5/378 |
| 2018/0041684 A1* | 2/2018 | Hilldore | H04N 5/2357 |
| 2018/0047176 A1* | 2/2018 | Toyoda | G06T 7/337 |
| 2018/0075304 A1* | 3/2018 | Li | G06T 7/194 |
| 2018/0075748 A1* | 3/2018 | Park | B60T 7/22 |
| 2018/0110493 A1* | 4/2018 | Golan | A61B 6/5229 |
| 2018/0253616 A1* | 9/2018 | Johnson | G06V 20/63 |
| 2018/0286076 A1* | 10/2018 | Lindgren | G06T 7/77 |
| 2018/0359403 A1* | 12/2018 | Zhang | H05B 47/105 |
| 2018/0367734 A1* | 12/2018 | Thumpudi | H04N 5/23264 |
| 2019/0037118 A1* | 1/2019 | Oh | H04N 5/23222 |
| 2019/0114760 A1* | 4/2019 | Ni | G06V 20/52 |
| 2019/0199906 A1* | 6/2019 | Honda | G03B 7/093 |
| 2019/0285479 A1* | 9/2019 | Aoki | G01J 5/48 |

\* cited by examiner

VEHICULAR IMAGE PICKUP DEVICE AND IMAGE CAPTURING METHOD

CROSS-REFERENCE TO RELATED APPLICATIONS

This application is a divisional of U.S. application Ser. No. 16/034,098, the entirety of which is hereby incorporated by reference.

BACKGROUND OF THE INVENTION

Field of the Invention

The present disclosure relates to image capturing technology and, more particularly, to a vehicular image pickup device and an image capturing method.

Description of the Prior Art

Image pickup devices are capable of recording images and thus have wide application, including ones installed at entrances and exits of buildings which require surveillance, to assist with tasks, such as conducting an investigation, preserving and collecting evidence.

Normally, conventional image pickup devices are each installed at a specific point to capture images within its image capturing radius according to an invariable operation model. However, if a conventional image pickup device is mounted on a moving object, for example, a vehicle, image quality of images captured by the image pickup device deteriorates, depending on the speed of the moving object. Furthermore, accuracy of ensuing recognition of the captured images is affected.

SUMMARY OF THE INVENTION

In an embodiment, an image capturing method comprises the steps of: capturing a plurality of driving images sequentially by an image capturing unit; performing an image analysis on two of the driving images to obtain a variance of the object image; and setting a shutter speed of the image capturing unit according to the variance. The driving images each comprise an object image.

In an embodiment, a vehicular image pickup device comprises an image capturing unit and a processing unit. The image capturing unit captures a plurality of driving images sequentially. The driving images each comprise an object image. The processing unit performs an image analysis on two of the driving images to obtain a variance of the object image. Then, the processing unit sets a shutter speed of the image capturing unit according to the variance.

In conclusion, a vehicular image pickup device and an image capturing method in the embodiments of the present disclosure set a shutter speed according to a variance of an object image in driving images so as to obtain sharp driving images, fine-tune a fill light intensity or gain according to a grayscale quantity distribution of the driving images so as to obtain driving images with appropriate brightness, and fine-tune the shutter speed, fill light intensity or gain according to a frequency spectrum of the driving images or a brightness distribution of an object image so as to augment the detailed performance of the driving images. Furthermore, the vehicular image pickup device and the image capturing method in the embodiments of the present disclosure dispense with the need to wait for feedback from a back-end system and thus are capable of confirming the image quality of the driving images and performing fine-tuning operation; hence, the driving images of enhanced image quality can be quickly obtained.

Fine structures and advantages of the present disclosure are described below with reference to preferred embodiments of the present disclosure to enable persons skilled in the art to gain insight into the technical features of the present disclosure and implement the present disclosure accordingly. Persons skilled in the art can easily understand the objectives and advantages of the present disclosure by making reference to the disclosure contained in the specification, the claims, and the drawings.

DETAILED DESCRIPTION OF THE EMBODIMENTS

Figure 1:
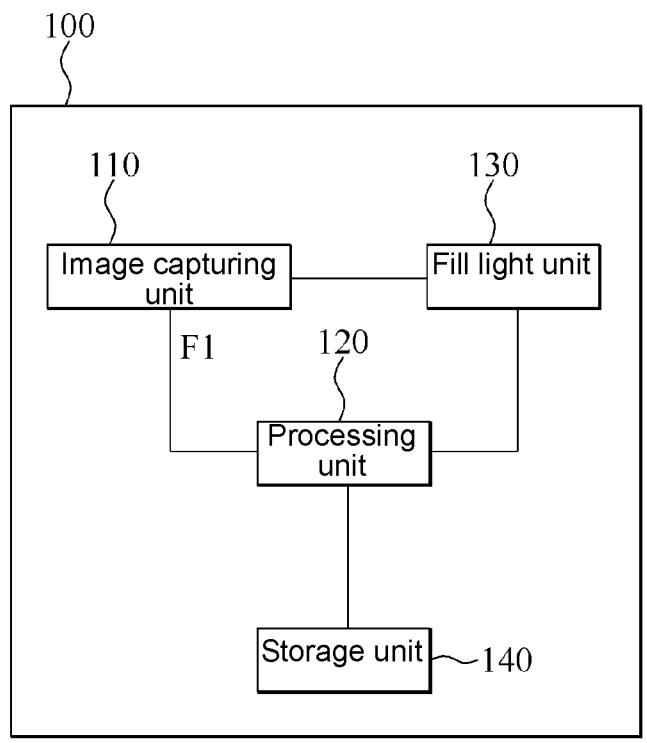
FIG. 1 is a block diagram of a vehicular image pickup device according to an embodiment of the present disclosure.

FIG. 1 is a block diagram of a vehicular image pickup device 100 according to an embodiment of the present disclosure. Referring to FIG. 1, in general, the vehicular image pickup device 100 is mounted on a means of transport and adapted to capture and record a driving image F1. In some embodiment aspects, the means of transport is a car or a motorcycle, but the present disclosure is not limited thereto. Any appropriate means of transport, which is suitable for use with the vehicular image pickup device 100, is applicable to the present disclosure.

In an embodiment, the vehicular image pickup device 100 comprises an image capturing unit 110 and a processing unit 120. The processing unit 120 is coupled to the image capturing unit 110. The vehicular image pickup device 100 further comprises a fill light unit 130. The fill light unit 130 is coupled to the image capturing unit 110 and the processing unit 120.

The image capturing unit 110 captures a plurality of driving images F1. The driving images F1 are frames captured by the image capturing unit 110 during a continuous time period. The fill light unit 130 outputs a fill light, i.e., a supplementary light, so as to assist with the image-capturing function of the image capturing unit 110.

In some embodiment aspects, the image capturing unit 110 comprises an assembly of lenses and light-sensing components. The light-sensing components include, for example, a complementary metal-oxide semiconductor (CMOS) and a charge-coupled device (CCD). The fill light unit 130 is, for example, implemented by a light-emitting diode (LED), an infrared LED (IR LED), a halogen lamp, or a laser source, but the present disclosure is not limited thereto.

The processing unit 120 controls and adjusts the operation of the image capturing unit 110 and/or the fill light unit 130 according to the image capturing method in any embodiment of the present disclosure to enhance the image quality of the driving images F1 captured by the image capturing unit 110.

In some embodiment aspects, the processing unit 120 is, for example, a system-on-a-chip (SoC), a central processing unit (CPU), a microcontroller (MCU), or an application-specific integrated circuit (ASIC).

Figure 2:
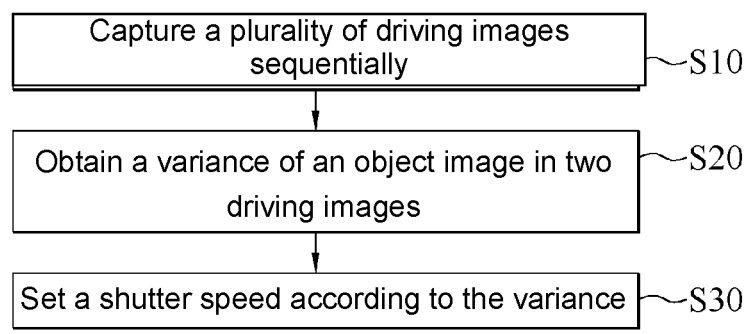
FIG. 2 is a schematic view of a process flow of an image capturing method according to an embodiment of the present disclosure.

FIG. 2 is a schematic view of a process flow of an image capturing method according to an embodiment of the present disclosure. Referring to FIG. 1 and FIG. 2, using an embodiment of the image capturing method, the processing unit 120 instructs the image capturing unit 110 to capture a plurality of driving images F1 sequentially (step S10). The driving images F1 each comprise an object image M1. Afterward, the processing unit 120 performs an image analysis on two of the driving images F1 to obtain a variance of the object image M1 in the two driving images F1 (step S20). Then, the processing unit 120 sets a shutter speed of the image capturing unit 110 according to the variance obtained in step S20 (step S30). Afterward, the processing unit 120 goes back to step S10 to repeat the aforesaid adjustment steps again.

In an embodiment of step S10, the image capturing unit 110 captures each driving image F1 with a global shutter, but the present disclosure is not limited thereto. In a variant embodiment of step S10, the image capturing unit 110 captures each driving image F1 with a rolling shutter.

In an initial state, the image capturing unit 110 captures a plurality of driving images F1 sequentially at a predetermined shutter speed. In some embodiment aspects, the predetermined shutter speed ranges from 1/1000 to 1/100000 per second.

In an embodiment of step S20, the processing unit 120 performs an image processing process on each driving image F1 to confirm whether the driving images F1 each include the object image M1.

In an embodiment of step S20, the processing unit 120 performs an image analysis on any two of the driving images F1 selectively, as long as the two selected driving images F1 include the object image M1, so as to obtain a variance. In an embodiment aspect, the processing unit 120 selectively performs an image analysis on both the first one of the driving images F1 (if the first one of the driving images F1 includes the object image M1) and the last one of the driving images F1 (if the last one of the driving images F1 includes the object image M1.) In another embodiment aspect, the processing unit 120 selectively performs an image analysis on two consecutive ones of the driving images F1, as long as the two consecutive driving images F1 include the object image M1. The variance obtained as a result of the image analysis performed by the processing unit 120 is the displacement (i.e., variation in location) of the object image M1 in the two driving images F1; hence, the variance is location variance, for example, the distance traveled by the object image M1 along the X-axis in the two driving images F1, but the present disclosure is not limited thereto. In a variant embodiment, the variance obtained by the processing unit 120 is the speed at which the object image M1 moves as shown in the two driving images F1.

In some embodiment aspects, the processing unit 120 obtains the variance of the object image M1 by image subtraction, but the present disclosure is not limited thereto. In a variant embodiment, the processing unit 120 obtains the variance of the object image M1 by any appropriate image analysis algorithm.

Figure 3:
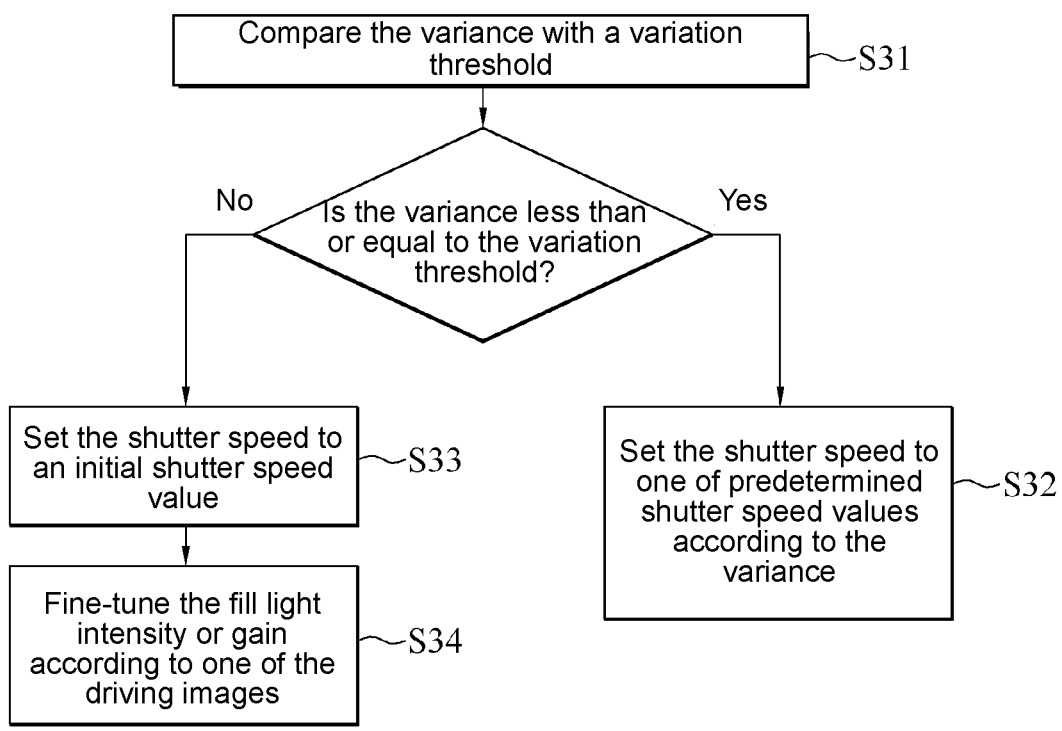
FIG. 3 is a schematic view of a process flow of step S30 in FIG. 2 according to an embodiment of the present disclosure.

FIG. 3 is a schematic view of a process flow of step S30 in FIG. 2 according to an embodiment of the present disclosure. In an embodiment of step S30, the processing unit 120 compares the variance of the object image M1 with a predetermined variation threshold (step S31). Upon determination that the variance is less than or equal to the variation threshold, the processing unit 120 selects a predetermined shutter speed value from a plurality of predetermined shutter speed values according to the current value of the variance and sets the shutter speed of the image capturing unit 110 to the predetermined shutter speed value (step S32). Upon determination that the variance is greater than the variation threshold, the processing unit 120 sets the shutter speed of the image capturing unit 110 to an initial shutter speed value (step S33) and then fine-tunes the fill light intensity of the fill light unit 130 or the gain of the image capturing unit 110 according to one of the driving images F1 (step S34).

In some embodiments, the vehicular image pickup device 100 further comprises a storage unit 140. The storage unit 140 is coupled to the processing unit 120. The storage unit 140 stores the variation threshold, the predetermined shutter speed values, the initial shutter speed value, the fill light intensity and/or gain.

In an embodiment of step S32, an exemplary relationship between the variance value and the predetermined shutter speed value is shown in Table 1. For the sake of illustration, Table 1 shows only four variance values and their respective predetermined shutter speed values. As shown in Table 1, the variance relates to speed, and its unit of measurement is km/h, whereas the unit of measurement of the predetermined shutter speed values is second, but the present disclosure is not limited thereto.

TABLE 1 relationship between predetermined shutter speed value and variance value

| Serial number | A1 | A2 | A3 | A4 |
| --- | --- | --- | --- | --- |
| Variance value | 20 | 40 | 80 | 160 |
| Predetermined shutter speed value | 1/500 | 1/1000 | 1/2000 | 1/4000 |

Referring to Table 1, variances A1-A4 each have a one-to-one relationship with its respective predetermined shutter speed value substantially, and their relationships are stored in the storage unit 140. Therefore, in step S32, the processing unit 120 selects the predetermined shutter speed values by looking up the table.

For instance, given a variation threshold of 40 (km/h), if the variance obtained by the processing unit 120 is 20 (km/h) and thus less than the variation threshold, the processing unit 120 compares the obtained variance with the variances A1-A4 shown in Table 1 descriptive of the aforesaid relationships stored in the storage unit 140. Therefore, if the variance obtained by the processing unit 120 equals variance A1, the processing unit 120 identifies the predetermined shutter speed value to be 1/500 (second) according to Table 1 and sets the shutter speed of the image capturing unit 110 accordingly. In another embodiment, if the variance obtained by the processing unit 120 is 30 (km/h) and thus less than the variation threshold, the processing unit 120 compares the obtained variance with the variances A1-A4 shown in Table 1 descriptive of the aforesaid relationships stored in the storage unit 140. However, none of the variances obtained by the processing unit 120 equals the variances A1-A4, and thus the processing unit 120 sets the shutter speed of the image capturing unit 110 with variance A2 which is greater than and closest to the obtained variances.

In an embodiment of step S33, the initial shutter speed value is 1/1000 second.

In an embodiment of step S34, the driving image F1 comprises a plurality of pixels. The pixels display grayscales according to grayscale levels in a plurality of grayscale levels. Hence, how the driving image F1 looks depends on the grayscales displayed by the pixels and their locations.

In some embodiment aspects, the driving image F1 consists of 1280*720 pixels, but the present disclosure is not limited thereto. In a variant embodiment, the driving image F1 consists of 360*240 pixels, 1920*1080 pixels, or any display standard-complying number of pixels.

In some embodiment aspects, the grayscale levels are in the number of 256, for example, from grayscale level 0 to grayscale level 255, with grayscale level 0 denoting the least brightness, and grayscale level 255 denoting the highest brightness, but the present disclosure is not limited thereto. In a variant embodiment, the number of the grayscale levels depends on the performance of the image capturing unit 110. For instance, the image capturing unit 110 comprises an analog-to-digital conversion circuit. If the analog-to-digital conversion circuit operates on a 10-bit basis, the image capturing unit 110 provides performance of 1024 (i.e., $2^{10}$) grayscale levels. The other cases are inferred by analogy.

Figure 4:
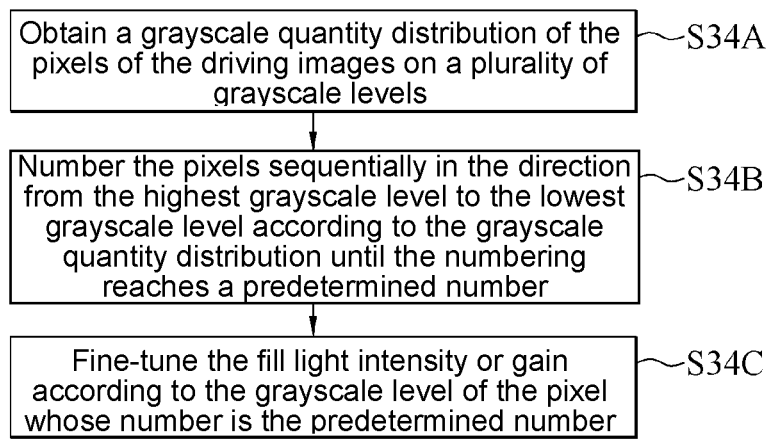
FIG. 4 is a schematic view of a process flow of step S34 in FIG. 3 according to an embodiment of the present disclosure.
Figure 5:
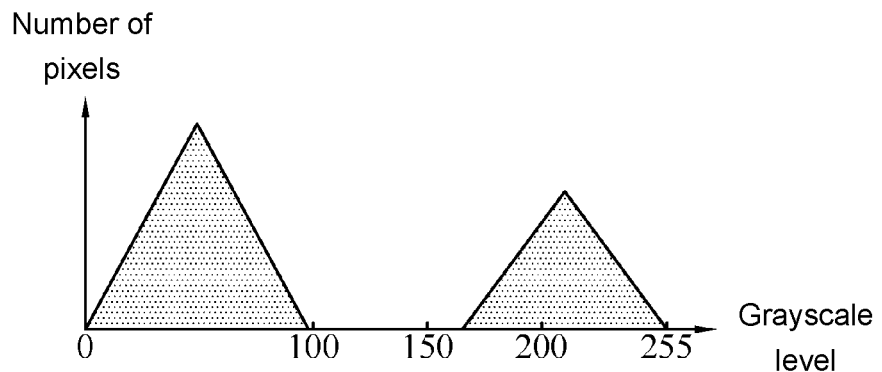
FIG. 5 is a histogram of driving images according to an embodiment of the present disclosure.

FIG. 4 is a schematic view of a process flow of step S34 in FIG. 3 according to an embodiment of the present disclosure. FIG. 5 is a histogram of driving images according to an embodiment of the present disclosure. Referring to FIG. 1 through FIG. 5, in an embodiment of step S34, the processing unit 120 makes a histogram of the driving images F1 by image integration and thus obtains a grayscale quantity distribution of the pixels of the driving images F1 on a plurality of grayscale levels (step S34A). Then, the processing unit 120 numbers the pixels sequentially in the direction from the highest grayscale level to the lowest grayscale level according to the grayscale quantity distribution obtained in step S34A until the numbering reaches a predetermined number (step S34B). Afterward, the processing unit 120 fine-tunes the fill light intensity of the fill light unit 130 or the gain of the image capturing unit 110 according to the grayscale level of the pixel whose number is the predetermined number (step S34C) such that the highest brightness of the driving images F1 can be adjusted to a reasonable range without becoming too bright or too dim.

In an embodiment of step S34B, the predetermined number equals the number of pixels generally occupied by the object image M1 in the driving images F1. In some embodiment aspects, if the object image M1 is an image of a license plate, the predetermined number ranges from 1000 to 3000 or ranges from 2000 to 3000, but the present disclosure is not limited thereto. In a variant embodiment, the predetermined number depends on the number of pixels which must be occupied by the image of the license plate in order to correctly recognize every country's license plates and sizes thereof.

In general, the object image M1 in the driving images F1 captured in the presence of the fill light of the fill light unit 130 must has the highest brightness, when compared with the rest of the driving images F1; hence, the pixels displaying the object image M1 must be associated with the relatively high grayscale levels in the grayscale quantity distribution. Therefore, the processing unit 120 numbers the pixels sequentially in the direction from the highest grayscale level to the lowest grayscale level so as to identify the lowest grayscale level associated with the pixels displaying the object image M1.

For instance, given 256 grayscale levels and a predetermined number 1000, the processing unit 120 numbers pixels sequentially in the direction from grayscale level 255 to grayscale level 0, that is, numbers the pixels at grayscale level 255, the pixels at grayscale level 254, the pixels at grayscale level 253, and so forth. The aforesaid pixel numbering process is accompanied by the cumulative counting of the pixels numbered, and it stops as soon as the count reaches the predetermined number 1000.

Figure 6:
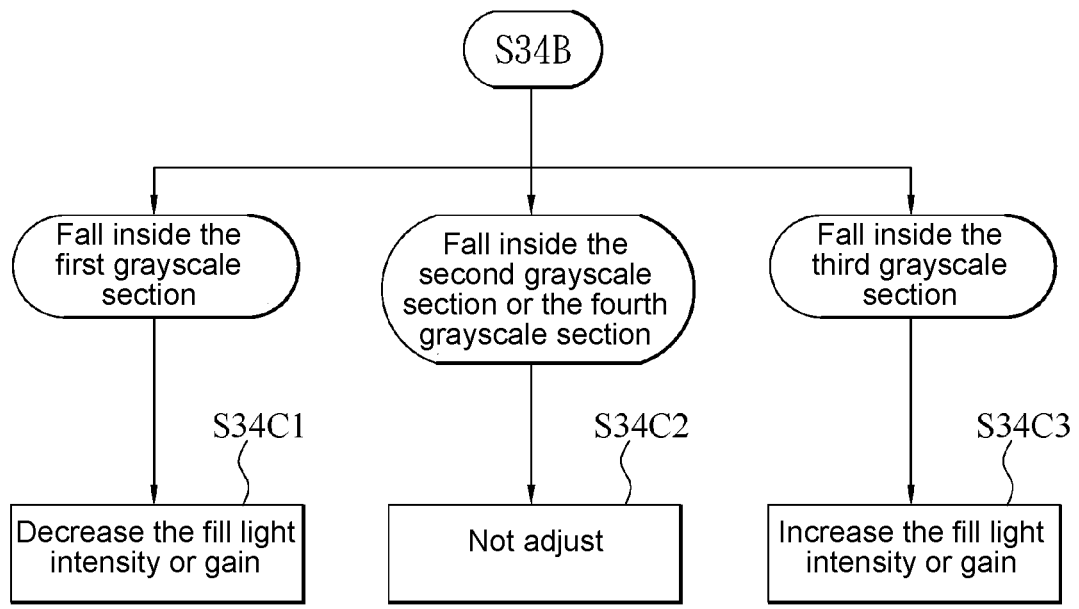
FIG. 6 is a schematic view of a process flow of step S34C in FIG. 4 according to an embodiment of the present disclosure.

FIG. 6 is a schematic view of a process flow of step S34C in FIG. 4 according to an embodiment of the present disclosure. Referring to FIG. 1 through FIG. 6, in an embodiment of step S34C, the grayscale levels are divided into a plurality of grayscale sections. The processing unit 120 performs adjustment operations by identifying the grayscale section which the grayscale level associated with the pixels numbered with the predetermined number falls inside.

The description below is exemplified by 256 grayscale levels. The grayscale levels are divided into grayscale sections, namely the first grayscale section, the second grayscale section, the third grayscale section and the fourth grayscale section, sequentially in the direction from the highest grayscale level 255 to the lowest grayscale level 0.

The grayscale level 255 to grayscale level 200 are defined as the first grayscale section. The grayscale level 199 to grayscale level 150 are defined as the second grayscale section. The grayscale level 149 to grayscale level 100 are defined as the third grayscale section. The grayscale level 99 to grayscale level 0 are defined as the fourth grayscale section. The exemplary relationship between the grayscale sections and adjustment operations are shown in Table 2 below.

TABLE 2 relationship between grayscale sections and adjustment operations

| | Grayscale section | | | |
| --- | --- | --- | --- | --- |
| | First grayscale section | Second grayscale section | Third grayscale section | Fourth grayscale section |
| Grayscale level | 255~200 | 199~150 | 149~100 | 99~0 |
| Brightness status | Too bright | Appropriate | Too dim | No object image |
| Adjustment operation | Decrease fill light intensity or gain | Nil | Increase fill light intensity or gain | Nil |

If the grayscale level associated with the pixels numbered with the predetermined number falls inside the first grayscale section, it means that the object image M1 is currently too bright. Therefore, the processing unit 120 decrease the fill light intensity of the fill light unit 130 or the gain of the image capturing unit 110 (step S34C1) in order to correct the problem.

If the grayscale level associated with the pixels numbered with the predetermined number falls inside the second grayscale section, it means that brightness of the object image M1 is currently appropriate. Therefore, the processing unit 120 does not adjust the fill light intensity of the fill light unit 130 or the gain of the image capturing unit 110 (step S34C2).

If the grayscale level associated with the pixels numbered with the predetermined number falls inside the third grayscale section, it means that the object image M1 is currently too dim. Therefore, the processing unit 120 increases the fill light intensity of the fill light unit 130 or the gain of the image capturing unit 110 (step S34C3) in order to correct the problem.

If the grayscale level associated with the pixels numbered with the predetermined number falls inside the fourth grayscale section, it means that the object image M1 is absent from the driving images F1. Therefore, the processing unit 120 does not perform any adjustment operation but proceeds to perform step S34C2.

Figure 7:
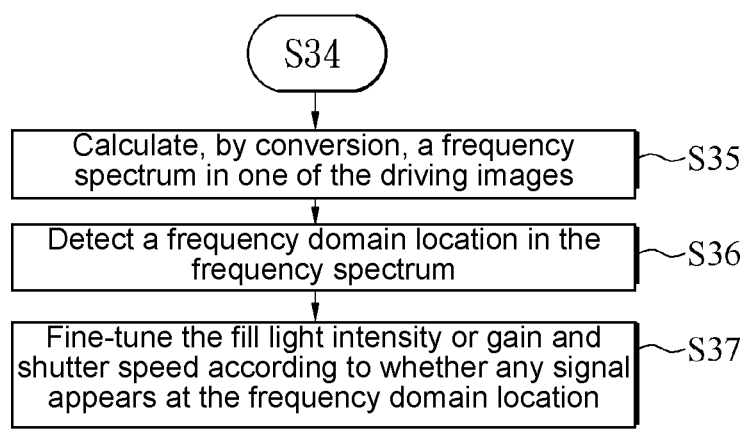
FIG. 7 is a schematic view of a process flow of an image capturing method after step S34 according to an embodiment of the present disclosure.
Figure 8:
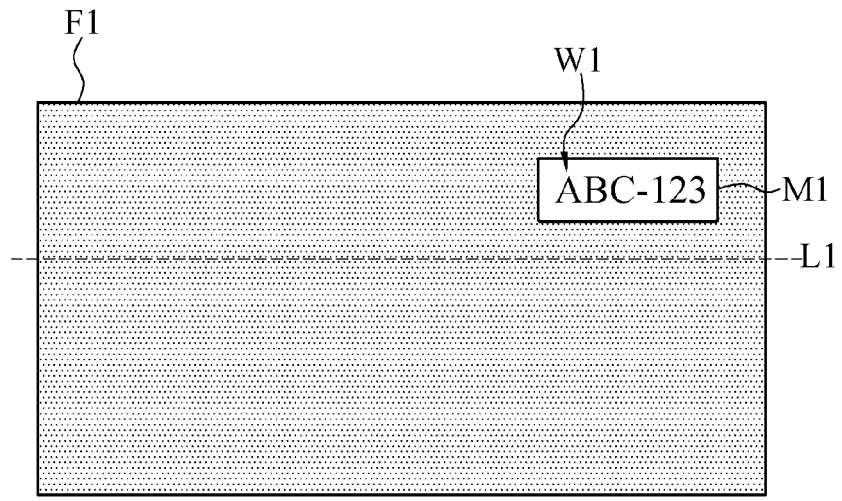
FIG. 8 is a schematic view of driving images according to an embodiment of the present disclosure.

FIG. 7 is a schematic view of a process flow of an image capturing method after step S34 according to an embodiment of the present disclosure. FIG. 8 is a schematic view of driving images according to an embodiment of the present disclosure. Referring to FIG. 1 through FIG. 8, in an embodiment of the image capturing method, after step S34, the processing unit 120 performs frequency domain conversion on one of the driving images F1 to calculate, by conversion, a frequency spectrum of the driving image F1 (step S35). Afterward, the processing unit 120 further detects a frequency domain location in the frequency spectrum (step S36), fine-tunes the fill light intensity of the fill light unit 130 or the gain of the image capturing unit 110, and fine-tunes the shutter speed of the image capturing unit 110, according to whether any signal appears at the frequency domain location (step S37), so as to further optimize the image quality of the images captured by the vehicular image pickup device 100 by the aforesaid fine-tuning operations.

In an embodiment of step S35, the frequency domain conversion is implemented by Fourier transform.

In an embodiment of step S36, the object image M1 comprises a plurality of character images W1. The processing unit 120 defines a straight line L1 penetrating the driving images F1 and thus obtains the frequency domain location according to the number of pixels on the straight line L1 penetrating the driving images F1 and the number of pixels displaying the character images W1 and aligned in the same direction as the straight line L1. In some embodiment aspects, the frequency domain location is a high frequency location in the frequency spectrum.

The description below is exemplified by the driving image F1 with an image format of 1280*720. If the driving image F1 has an image format of 1280*720, it means that the driving image F1 has 1280 pixels on the horizontal axis (i.e., X-axis) and 720 pixels on the vertical axis (i.e., Y-axis), and thus the driving image F1 consists of 1280*720 pixels. If the processing unit 120 defines the straight line L1 which runs along the horizontal axis of the driving image F1, the straight line L1 must penetrate 1280 pixels in the driving image F1. The number of pixels (along the straight line L1) displaying the character images W1 equals the number (say, 3~10) of pixels required for recognition of the character images W1. In this regard, the description below is exemplified by three pixels. Therefore, the processing unit 120 detects 3/1280 frequency domain locations, but the present disclosure is not limited thereto. In a variant embodiment, the straight line L1 penetrating the driving image F1 runs along the vertical axis of the driving image F1 or in any other appropriate direction.

Figure 9:
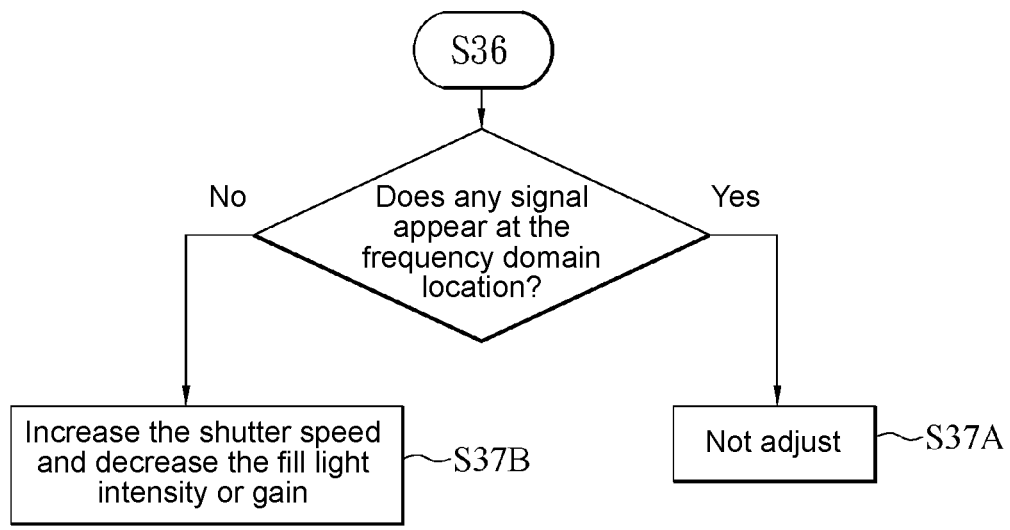
FIG. 9 is a schematic view of a process flow of step S37 in FIG. 7 according to an embodiment of the present disclosure.

FIG. 9 is a schematic view of a process flow of step S37 in FIG. 7 according to an embodiment of the present disclosure. Referring to FIG. 1 through FIG. 9, in an embodiment of step S37, if in step S36 the processing unit 120 detects that a signal appears at the frequency domain location, the processing unit 120 determines that the driving image F1 is sharp enough, and thus the processing unit 120 does not adjust the gain and shutter speed of the image capturing unit 110 and the fill light intensity of the fill light unit 130 (step S37A). If in step S36 the processing unit 120 does not detect any signal at the frequency domain location, the processing unit 120 determines that the driving image F1 is not sharp enough, that is, is blurred, and thus the processing unit 120 increases the shutter speed of the image capturing unit 110 and decreases one of the gain of the image capturing unit 110 and the fill light intensity of the fill light unit 130 (step S37B), so as to ensure that the driving images F1 captured by the image capturing unit 110 after the fine-tuning operations will have sufficient brightness and sharpness.

In some embodiments, the processing unit 120 performs step S35 through step S37 repeatedly to effectuate fine-tuning repeatedly, and it is only when the processing unit 120 determines that the driving image F1 has sufficiently high spectrum response that the processing unit 120 stops performing the fine-tuning operations of step S35 through step S37.

In conclusion, in step S35 through step S37, the processing unit 120 confirms whether the driving image F1 lacks a high frequency signal by frequency domain conversion and thus confirms the image quality of the driving image F1 to therefore enable quick feedback and perform fine-tuning accordingly, so as to obtain the driving images F1 with enhanced image quality quickly.

Figure 10:
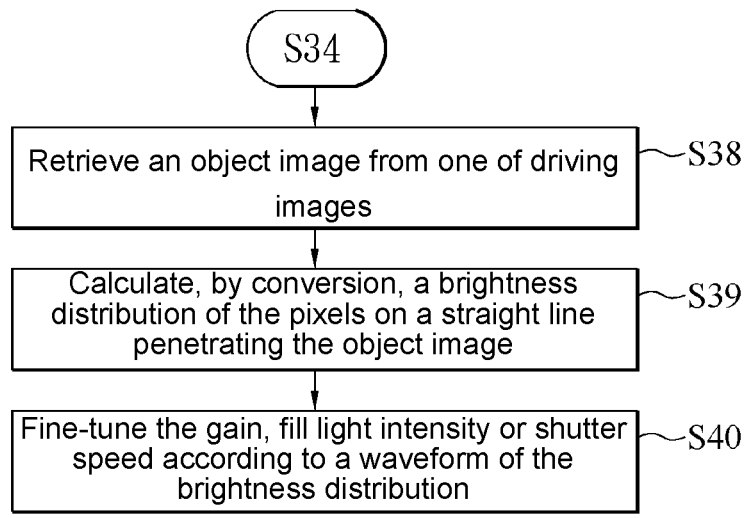
FIG. 10 is a schematic view of a process flow of an image capturing method after step S34 according to an embodiment of the present disclosure.
Figure 11:
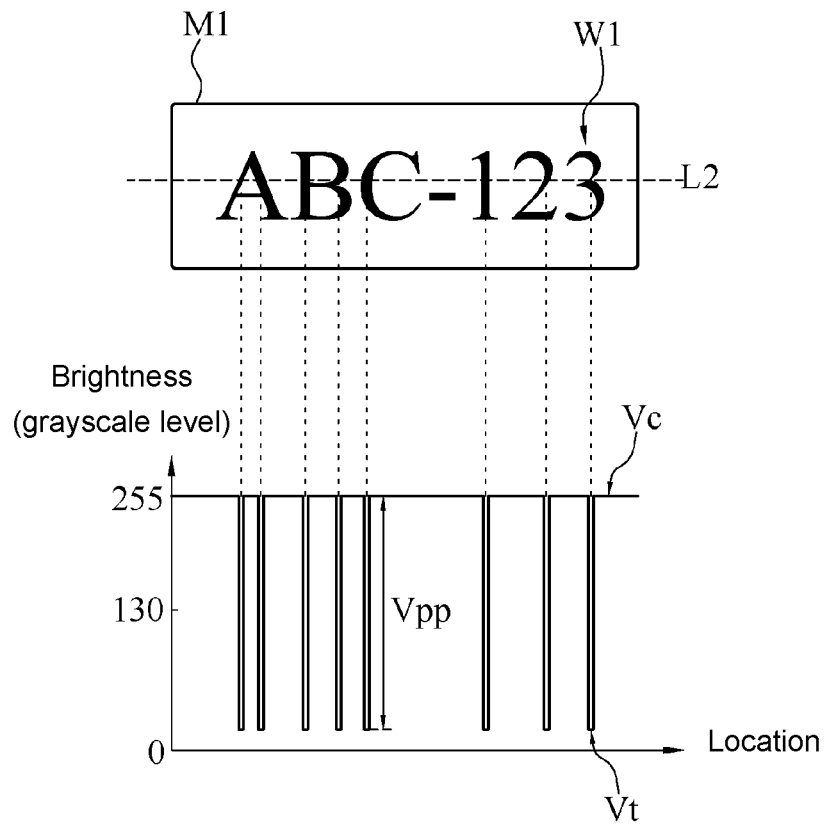
FIG. 11 is a schematic view of an object image and its brightness distribution according to an embodiment of the present disclosure.

FIG. 10 is a schematic view of a process flow of an image capturing method after step S34 according to an embodiment of the present disclosure. FIG. 11 is a schematic view of an object image and its brightness distribution according to an embodiment of the present disclosure. Referring to FIG. 10 and FIG. 11, in an embodiment of the image capturing method, after step S34, the processing unit 120 retrieves the object image M1 from one of the driving images F1 (step S38) to therefore calculate, by conversion, a brightness distribution of the pixels on a straight line L2 penetrating the object image M1 (step S39). Afterward, the processing unit 120 fine-tunes the gain of the image capturing unit 110, the fill light intensity of the fill light unit 130 or the shutter speed of the image capturing unit 110 according to a waveform of the brightness distribution (step S40), so as to optimize the image quality of images captured by the vehicular image pickup device 100 by the aforesaid fine-tuning operations.

In some embodiments, the processing unit 120 performs step S38 through step S40 repeatedly to effectuate fine-tuning repeatedly, and it is only when the processing unit 120 determines that the driving image F1 has sufficiently high image quality that the processing unit 120 stops performing the fine-tuning operations of step S38 through step S40.

In an embodiment of step S38, the processing unit 120 retrieves the object image M1 from the driving image F1 by image processing technology, for example, image division.

In an embodiment of step S39, the processing unit 120 defines a straight line L2 penetrating the object image M1 and thus calculates, by conversion, a brightness distribution of brightness against location, according to all the pixels on the straight line L2 and their locations. In some embodiment aspects, the processing unit 120 defines the straight line L2 along the horizontal axis of the object image M1, but the present disclosure is not limited thereto. In a variant embodiment, the straight line L2 penetrating the object image M1 runs along the vertical axis of the object image M1 or in any other appropriate direction. In this regard, the object image M1 comprises a plurality of character images W1, and the straight line L2 penetrates character images W1.

Figure 12:
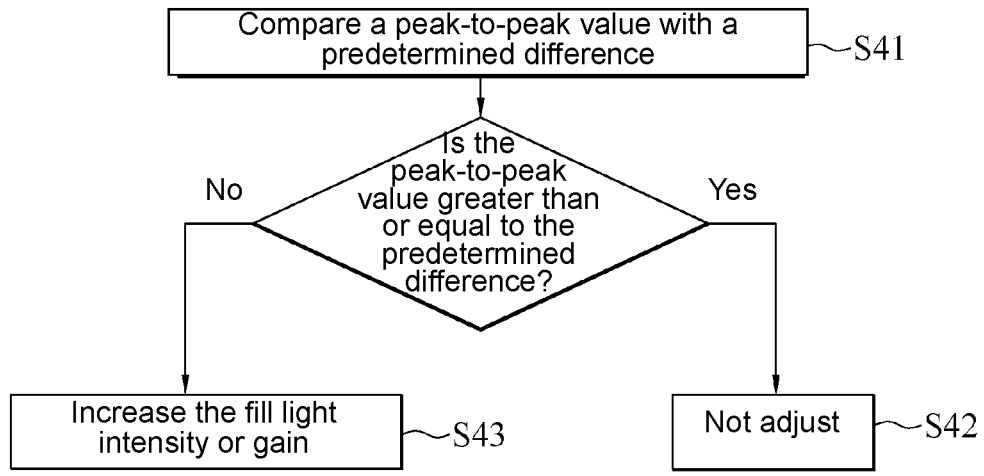
FIG. 12 is a schematic view of a process flow of step S40 in FIG. 10 according to an embodiment of the present disclosure.

FIG. 12 is a schematic view of a process flow of step S40 in FIG. 10 according to an embodiment of the present disclosure. Referring to FIG. 10 through FIG. 12, in an embodiment of step S40, the processing unit 120 performs the fine-tuning step according to a peak-to-peak value Vpp of the waveform of the brightness distribution calculated in step S39. The peak-to-peak value Vpp equals the difference between crest Vc and trough Vt of the waveform of the brightness distribution. Therefore, the processing unit 120 compares peak-to-peak value Vpp of the waveform with a predetermined difference (step S41). If the peak-to-peak value Vpp is greater than or equal to the predetermined difference, the processing unit 120 determines that the contrast of the object image M1 is sufficient and thus does not adjust the gain of the image capturing unit 110, the fill light intensity of the fill light unit 130, and the shutter speed of the image capturing unit 110 (step S42). If the peak-to-peak value Vpp is less than the predetermined difference, the processing unit 120 determines that contrast of the object image M1 is insufficient and enables the fill light unit 130 to increase its fill light intensity or enables the image capturing unit 110 to increase its gain (step S43), so as to increase the contrast of the object image M1 in the driving image F1 captured after the fine-tuning step.

In some embodiment aspects, the unit of measurement of the brightness in the brightness distribution is a grayscale level. The predetermined difference ranges from 90 grayscale levels to 110 grayscale levels. For instance, the predetermined difference is 100 grayscale levels, but the present disclosure is not limited thereto.

Figure 13:
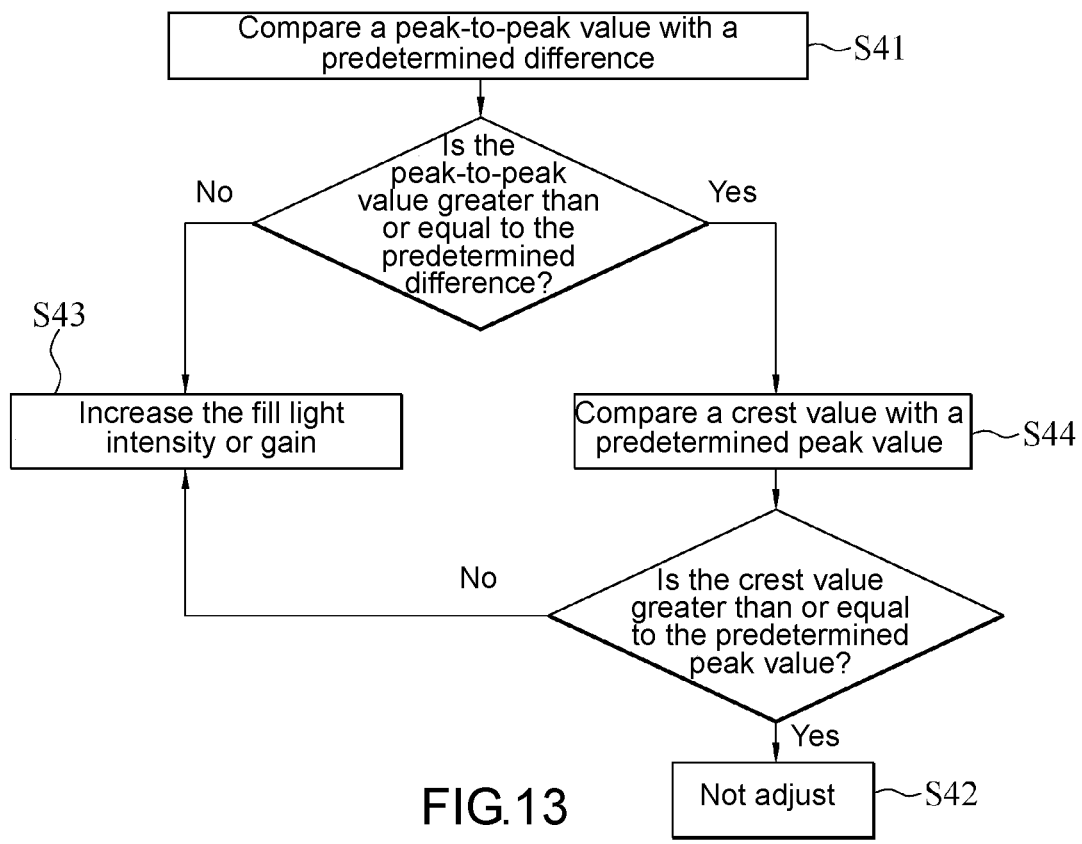
FIG. 13 is a schematic view of a process flow of step S40 in FIG. 10 according to an embodiment of the present disclosure.
Figure 14:
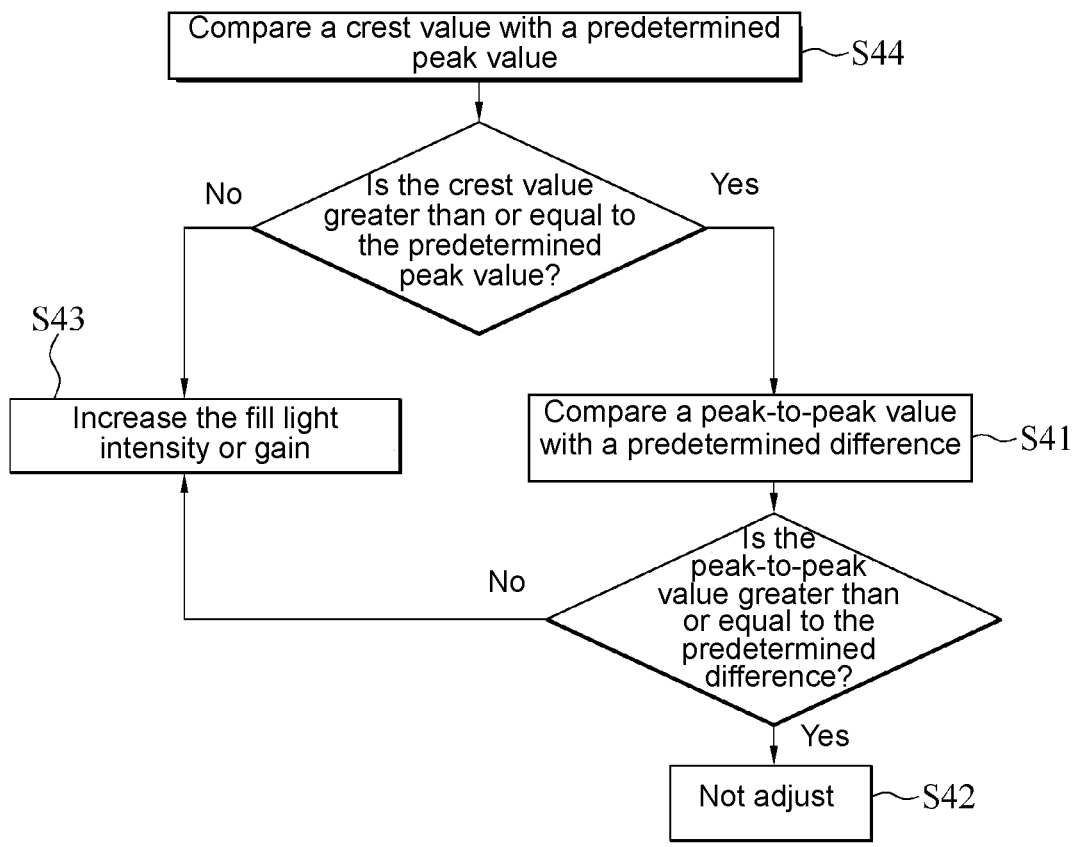
FIG. 14 is a schematic view of a process flow of step S40 in FIG. 10 according to an embodiment of the present disclosure.

FIG. 13 is a schematic view of a process flow of step S40 in FIG. 10 according to an embodiment of the present disclosure. Referring to FIG. 13, in an embodiment of step S40, in addition to the peak-to-peak value Vpp, the processing unit 120 performs fine-tuning according to a crest value. In an embodiment aspect, after step S41 and determining that the peak-to-peak value Vpp is greater than or equal to the predetermined difference, the processing unit 120 compares a crest value of the waveform with a predetermined peak value (step S44). If the comparison carried out in step S44 shows that the crest value is greater than or equal to the predetermined peak value, it means that the object image M1 does not have overly low brightness (i.e., is not too dim), and thus the processing unit 120 proceeds to perform step S42, that is, the processing unit 120 does not perform adjustment. Conversely, if the comparison carried out in step S44 shows that the crest value is less than the predetermined peak value, it means that the object image M1 is likely to have overly low brightness (i.e., is likely to be too dim), and thus the processing unit 120 performs step S43 in order to increase the brightness of the object image M1, but the present disclosure is not limited thereto. FIG. 14 is a schematic view of a process flow of step S40 in FIG. 10 according to an embodiment of the present disclosure. Referring to FIG. 14, in another embodiment aspect, the processing unit 120 performs step S44 before step S41. Afterward, if the comparison carried out in step S44 shows that the crest value is greater than or equal to predetermined peak value, the processing unit 120 proceeds to perform step S41 which entails comparing the peak-to-peak value Vpp and the predetermined difference. Then, the processing unit 120 proceeds to perform step S42 or step S43 according to the comparison result of step S41. If the comparison carried out in step S44 shows that the crest value is less than the predetermined peak value, the processing unit 120 proceeds to perform step S43.

Figure 15:
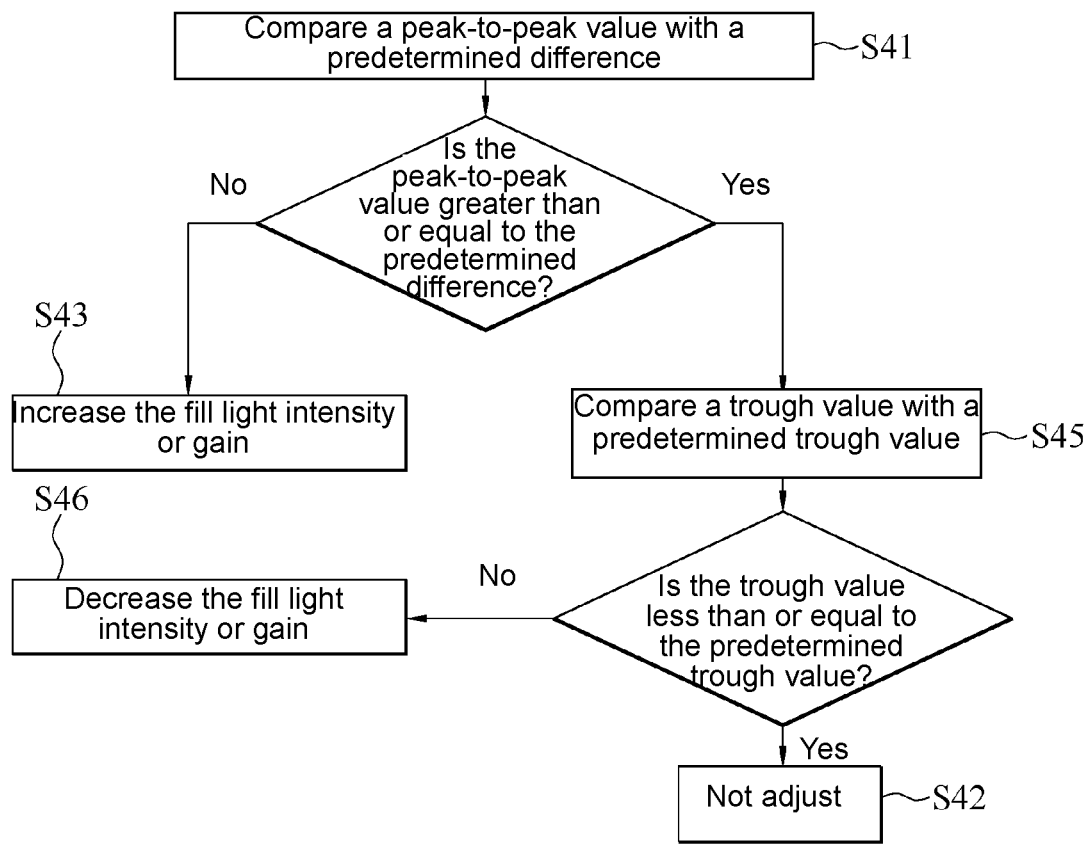
FIG. 15 is a schematic view of a process flow of step S40 in FIG. 10 according to an embodiment of the present disclosure.
Figure 16:
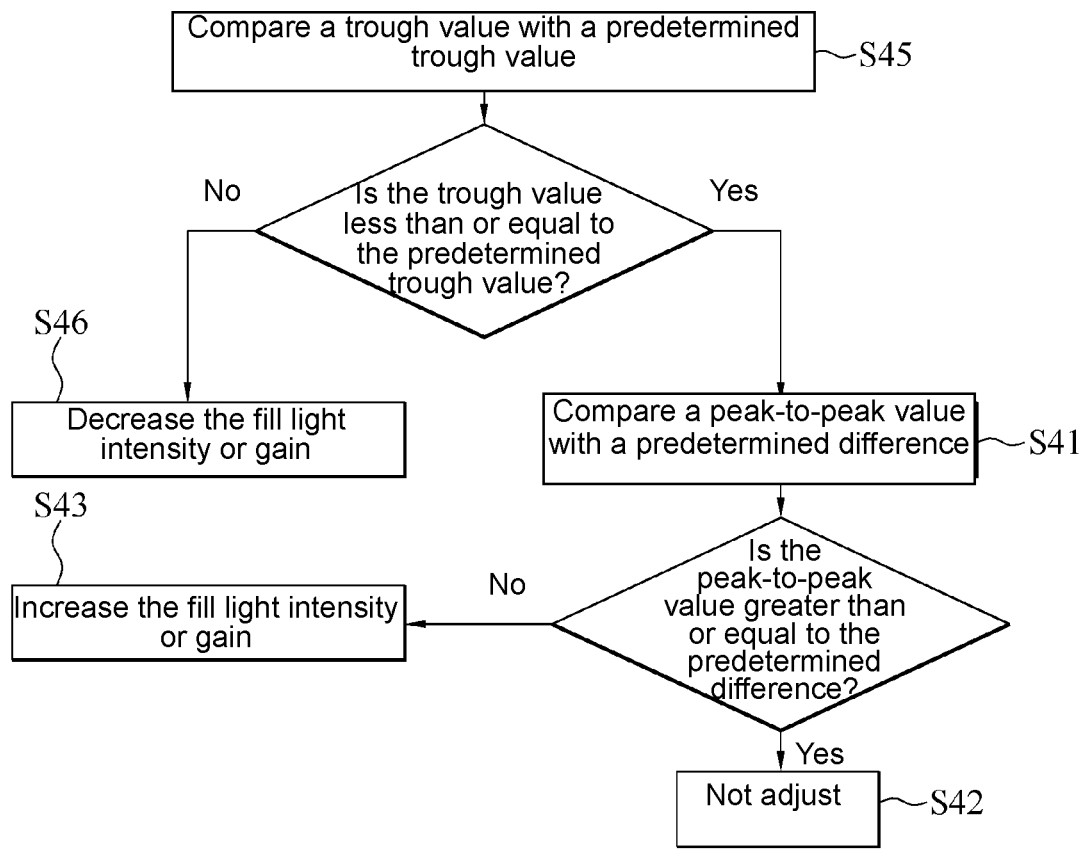
FIG. 16 is a schematic view of a process flow of step S40 in FIG. 10 according to an embodiment of the present disclosure.

FIG. 15 is a schematic view of a process flow of step S40 in FIG. 10 according to an embodiment of the present disclosure. Referring to FIG. 15, in an embodiment of step S40, in addition to the peak-to-peak value, the processing unit 120 performs fine-tuning according to a trough value. In an embodiment aspect, after step S41 and determining that the peak-to-peak value is greater than or equal to the predetermined difference, the processing unit 120 compares the trough value of the waveform with a predetermined trough value (step S45). If the comparison carried out in step S45 shows that the trough value is less than or equal to the predetermined trough value, it means that the object image M1 does not have overly high brightness (i.e., is not too bright), the processing unit 120 proceeds to perform step S42 (i.e., does not perform adjustment). Conversely, if the comparison carried out in step S45 shows that the trough value is greater than the predetermined trough value, it means: the object image M1 is likely to have overly high brightness (i.e., is likely to be too bright); the processing unit 120 enables the fill light unit 130 to decrease its fill light intensity or enables the image capturing unit 110 to decrease its gain (step S46), but the present disclosure is not limited thereto. FIG. 16 is a schematic view of a process flow of step S40 in FIG. 10 according to an embodiment of the present disclosure. Referring to FIG. 16, in another embodiment aspect, the processing unit 120 performs step S45 before step S41. Afterward, if the comparison carried out in step S45 shows that the trough value is less than or equal to the predetermined trough value, the processing unit 120 proceeds to perform step S41 which entails comparing the peak-to-peak value Vpp and the predetermined difference. Then, the processing unit 120 proceeds to perform step S42 or step S43 according to the comparison result of step S41. If the comparison carried out in step S45 shows that the trough value is greater than the predetermined trough value, the processing unit 120 proceeds to perform step S46.

In some embodiment aspects, predetermined peak value ranges from grayscale level 120 to grayscale level 140. The predetermined trough value ranges from grayscale level 120 to grayscale level 140. In some embodiment aspects, the predetermined peak value equals the predetermined trough value. For example, both the predetermined peak value and the predetermined trough value are grayscale level 130, but the present disclosure is not limited thereto.

Figure 17:
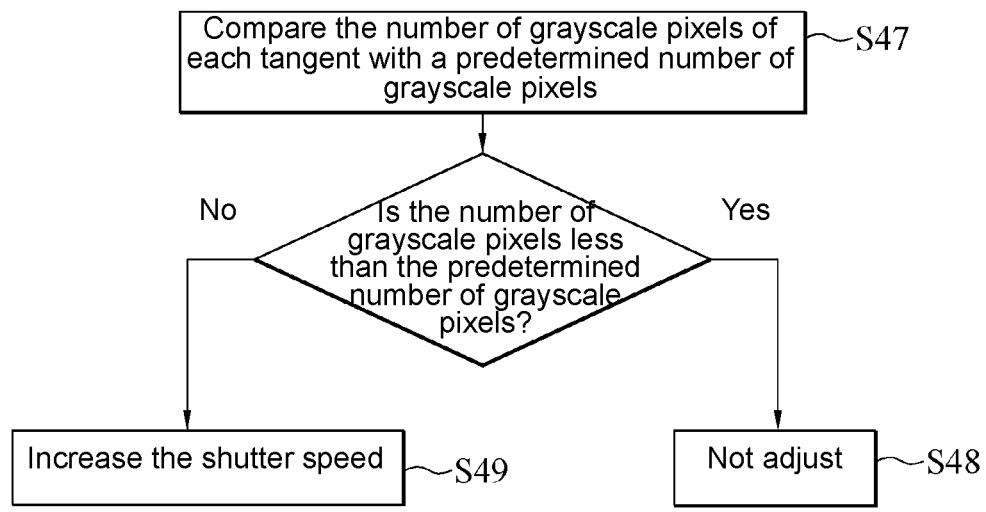
FIG. 17 is a schematic view of a process flow of step S40 in FIG. 10 according to an embodiment of the present disclosure.
Figure 18:
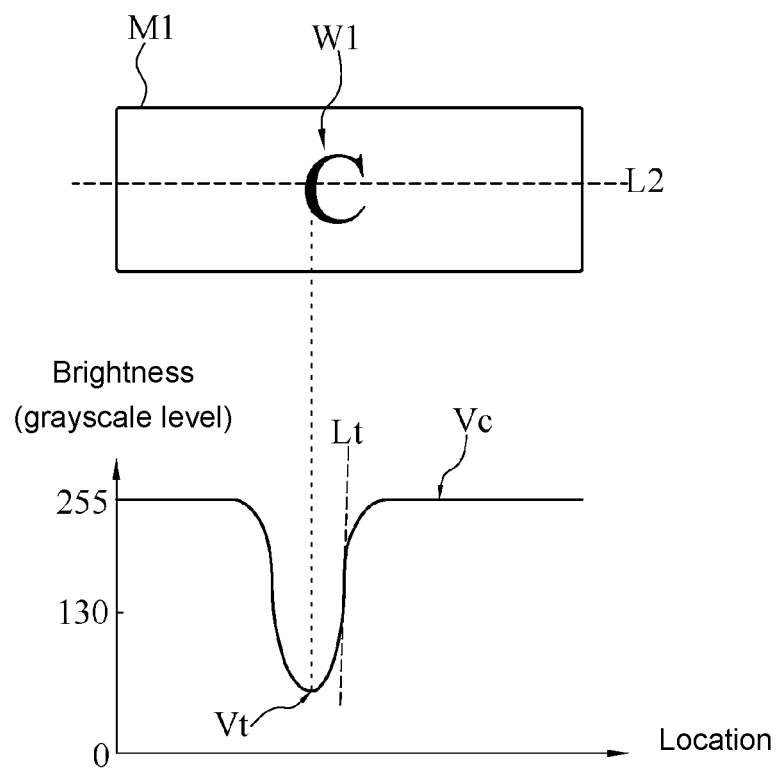
FIG. 18 is a schematic view of an object image and its brightness distribution according to an embodiment of the present disclosure.
Figure 19:
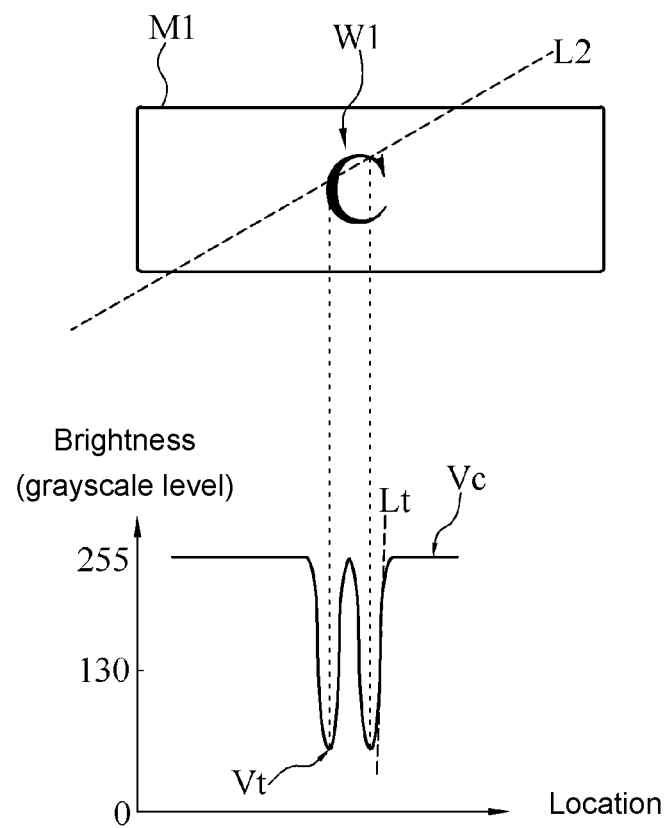
FIG. 19 is a schematic view of the object image and its brightness distribution according to an embodiment of the present disclosure.

FIG. 17 is a schematic view of a process flow of step S40 in FIG. 10 according to an embodiment of the present disclosure. FIG. 18 is a schematic view of an object image and its brightness distribution according to an embodiment of the present disclosure. FIG. 19 is a schematic view of the object image and its brightness distribution according to an embodiment of the present disclosure. Referring to FIG. 10, FIG. 17 through FIG. 19, in an embodiment of step S40, the processing unit 120 performs the fine-tuning step according to the number of grayscale pixels of each tangent Lt of the waveform of the brightness distribution calculated in step S39. The number of grayscale pixels of each tangent Lt equals the transition slope in transiting from crest Vc to trough Vt or the transition slope in transiting from trough Vt to crest Vc. In some embodiment aspects, the unit of measurement of the brightness in the brightness distribution is a grayscale level, and thus the unit of measurement of the number of grayscale pixels of the tangent is: grayscale level/number of pixels.

The processing unit 120 compares the number of grayscale pixels of each tangent with a predetermined number of grayscale pixels (step S47). If the number of grayscale pixels of each tangent is less than the predetermined number of grayscale pixels, it means: sharpness of the object image M1 is sufficient; and the processing unit 120 does not adjust the gain of the image capturing unit 110, the fill light intensity of the fill light unit 130, and the shutter speed of the image capturing unit 110 (step S48). If the number of grayscale pixels of any tangent is greater than the predetermined number of grayscale pixels, it means: sharpness of the object image M1 is insufficient; and the processing unit 120 enables the image capturing unit 110 to increase its shutter speed (step S49), so as to increase the sharpness of the object image M1 in the driving image F1 captured after the fine-tuning step.

In some embodiment aspects, the predetermined number of grayscale pixels falls within a specific numeric range, say, 0 to 2 (grayscale level/number of pixels), but the present disclosure is not limited thereto.

In conclusion, in step S38 through step S40, the processing unit 120 confirms the image quality of the driving images F1 according to a waveform of the brightness distribution of the object image M1 in the driving images F1 to therefore enable quick feedback and perform fine-tuning accordingly, so as to obtain the driving images F1 with enhanced image quality quickly.

In some embodiments, in step S10 through step S33 of the image capturing method, the processing unit 120 identifies a currently appropriate shutter speed such that the driving image F1 captured by the image capturing unit 110 does not blur. Afterward, in step S34 of the image capturing method, the processing unit 120 identifies a currently appropriate fill light intensity or gain such that the driving image F1 captured by the image capturing unit 110 has appropriate brightness. Furthermore, given the appropriate shutter speed and fill light intensity or gain, the processing unit 120 performs the fine-tuning operation of step S35 through step S37 or step S38 through step S40 of the image capturing method to further augment the detailed performance of the driving images F1.

Therefore, in some embodiment aspects, the product of the shutter speed of the image capturing unit 110, the gain of the image capturing unit 110, and the fill light intensity of the fill light unit 130 before and after the fine-tuning operation of step S37 (or step S40) remains the same. For instance, if the processing unit 120 enables the shutter speed to reduce to a half thereof, the processing unit 120 enables the gain or fill light intensity to double; hence, the product of the shutter speed, gain and fill light intensity is substantially the same before and after the fine-tuning operation; in other words, the fine-tuning operation brings no great change in the product of the shutter speed, gain and fill light intensity.

In some embodiments, the vehicular image pickup device 100 is for use in a detection system of the police forces. For instance, the vehicular image pickup device 100 is mounted on a police car. The vehicular image pickup device 100 is electrically connected to an internal system of the police car, and the internal system sends the captured driving image F1 to a back-end system. The back-end system performs post-processing and image recognition on the driving image F1, and thus assists the police in quickly recording and recognizing license plates and car models. The object image M1 in the driving image F1 is an image of a license plate or an image of the car body. The character images W1 are images of numerals or characters.

In conclusion, a vehicular image pickup device and an image capturing method in the embodiments of the present disclosure set a shutter speed according to a variance of an object image in driving images so as to obtain sharp driving images, fine-tune a fill light intensity or gain according to a grayscale quantity distribution of the driving images so as to obtain driving images with appropriate brightness, and fine-tune the shutter speed, fill light intensity or gain according to a frequency spectrum of the driving images or a brightness distribution of an object image so as to augment the detailed performance of the driving images. Furthermore, the vehicular image pickup device and the image capturing method in the embodiments of the present disclosure dispense with the need to wait for feedback from a back-end system and thus are capable of confirming the image quality of the driving images and performing fine-tuning operation; hence, the driving images of enhanced image quality can be quickly obtained.

Although the present disclosure is disclosed above by preferred embodiments, the preferred embodiments are not restrictive of the present disclosure. Changes and modifications made by persons skilled in the art to the preferred embodiments without departing from the spirit of the present disclosure must be deemed falling within the scope of the present disclosure. Accordingly, the legal protection for the present disclosure should be defined by the appended claims.

What is claimed is:

1. An image capturing method, comprising the steps of:
capturing a plurality of driving images sequentially by an image capturing unit, the driving images each comprising an object image;
performing an image analysis on two of the driving images to obtain a variance of the object image; and
setting a shutter speed of the image capturing unit according to the variance;
wherein the step of setting the shutter speed of the image capturing unit according to the variance comprises:
setting the shutter speed to one of a plurality of predetermined shutter speed values according to the variance if the variance is less than or equal to a variation threshold; and
setting the shutter speed to an initial shutter speed value and fine-tuning a fill light intensity of a fill light unit or a gain of the image capturing unit according to one of the driving images if the variance is greater than the variation threshold;
wherein the step of fine-tuning the fill light intensity or the gain according to one of the driving images is followed by the steps of:
retrieving the object image from one of the driving images;
calculating, by conversion, a brightness distribution of the pixels on a straight line penetrating the object image; and
fine-tuning the gain and the fill light intensity or the shutter speed according to a waveform of the brightness distribution; and
wherein the step of fine-tuning the gain, the fill light intensity or the shutter speed according to the waveform of the brightness distribution comprises:
comparing a peak-to-peak value of the waveform with a predetermined difference;
not adjusting the gain, the fill light intensity and the shutter speed if the peak-to-peak value is greater than or equal to the predetermined difference; and
increasing the fill light intensity or the gain if the peak-to-peak value is less than the predetermined difference.

2. The image capturing method of claim 1, wherein the step of fine-tuning the gain, the fill light intensity or the shutter speed according to the waveform of the brightness distribution further comprises:
comparing a crest value of the waveform with a predetermined peak value;
not adjusting the gain, the fill light intensity and the shutter speed if the crest value is greater than or equal to the predetermined peak value; and
increasing the fill light intensity or the gain if the crest value is less than the predetermined peak value.

3. The image capturing method of claim 1, wherein the step of fine-tuning the gain, the fill light intensity or the shutter speed according to the waveform of the brightness distribution further comprises:
comparing a trough value of the waveform with a predetermined trough value;
decreasing the fill light intensity or the gain if the trough value is greater than the predetermined trough value; and
not adjusting the gain, the fill light intensity and the shutter speed if the trough value is less than or equal to the predetermined trough value.

4. An image capturing method, comprising the steps of:
capturing a plurality of driving images sequentially by an image capturing unit, the driving images each comprising an object image;
performing an image analysis on two of the driving images to obtain a variance of the object image; and
setting a shutter speed of the image capturing unit according to the variance;
wherein the step of setting the shutter speed of the image capturing unit according to the variance comprises:
setting the shutter speed to one of a plurality of predetermined shutter speed values according to the variance if the variance is less than or equal to a variation threshold; and
setting the shutter speed to an initial shutter speed value and fine-tuning a fill light intensity of a fill light unit or a gain of the image capturing unit according to one of the driving images if the variance is greater than the variation threshold;
wherein the step of fine-tuning the fill light intensity or the gain according to one of the driving images is followed by the steps of:
retrieving the object image from one of the driving images;
calculating, by conversion, a brightness distribution of the pixels on a straight line penetrating the object image; and
fine-tuning the gain and the fill light intensity or the shutter speed according to a waveform of the brightness distribution; and
wherein the step of fine-tuning the gain, the fill light intensity or the shutter speed according to the waveform of the brightness distribution comprises:
not adjusting the gain, the fill light intensity and the shutter speed if the number of grayscale pixels of each tangent of the waveform is less than a predetermined number of grayscale pixels; and
increasing the shutter speed if the number of grayscale pixels of any tangent of the waveform is greater than the predetermined number of grayscale pixels.

* * * * *